Patented Apr. 7, 1942

2,278,592

UNITED STATES PATENT OFFICE 2,278,592

CONTACT ELEMENT

Vernon H. Sanders, Norbert J. Schaberl, and Erle I. Shobert, II, St. Marys, Pa., assignors to Stackpole Carbon Company, St. Marys, Pa., a corporation of Pennsylvania No Drawing. Application April 23, 1940, Serial No. 331,156

4 Claims. (Cl. 75—22)

This invention relates to metal alloys, and more particularly to electrical contact elements for circuit making and breaking devices.

It is among the objects of this invention to provide a method of making an alloy article which is easy and inexpensive, which requires no handling of molten metals, and which produces the alloy simultaneously with the formation of the article.

Another object is to provide an alloy by molding powdered metals.

Further objects are to provide a molded electrical contact element which has an alloy backing integrally united to a metallic contact face of different material, and which can be brazed or welded to a support without injuring the contact face or the bond between it and the backing. A still further object is to provide a method for making such a contact element.

In accordance with this invention the pure metals from which the desired alloy is to be made are obtained in the form of finely divided particles or powders. These are thoroughly commixed together in a ball mill with a suitable deoxidizing agent. An alloy that is especially suitable for use in electrical apparatus may be formed from about 69 per cent silver, 29 per cent copper, and 2 per cent phosphorous, all in powdered form.

After mixing in the ball mill the composite powder is preferably cold molded under high pressure to produce a fairly strong self-sustaining body. This body is then heated to a red heat and while hot it is pressed in a mold under very high pressure with a power press. During the heating operation the powdered metals in the body are melted and partially alloyed, and the pressing operation carries this alloying still further. In small articles that are going to be welded to another article it is not necessary that the alloying be complete because the heat of the welding will further alloy the constituent metals.

This invention thus involves the production of a metal alloy by hot molding powdered alloy-forming materials. The molding and alloying proceed simultaneously, so that an alloy article can be formed without first having to make an alloy in the usual manner in which molten metals must be handled. Instead, the alloy is formed by hot molding equipment in an easier and simpler manner.

This invention is of particular value in connection with the production of electrical contact elements in which it is desired to have an inexpensive, strong, durable and weldable body or backing provided with a contact face of different and more expensive material which is better suited for the engaging surfaces of a pair of contact elements used in a circuit making and breaking device. In such a case the contact face is formed of a metal-graphite compound, including a preponderant proportion of silver, nickel or tungsten, or mixture of these metals as the metallic ingredient that is used in association with graphite.

To make an electrical contact element in accordance with this invention, a mixture of powdered electric contact materials, preferably 95 per cent silver powder and 5 per cent graphite powder, is disposed in an even layer in a mold. An even layer of powdered alloy-forming materials is then placed over the silver-graphite layer. The top layer is generally much thinner than the face-forming layer, and is preferably composed of about 69 per cent silver, 29 per cent copper, and 2 per cent of a deoxidizing agent such as phosphorous, all in powder form. The powdered materials in the mold are then compacted under high pressure to form a cold molded composite body.

This cold molded body is then heated to red heat and pressed in a mold under very high pressure while hot. For example, the molded body may be heated to a temperature between 1200° and 1600° F. in from two to twenty seconds, and then immediately pressed under from five to twenty tons per square inch. The higher the temperature the less pressure required. The heat and pressure are such that the powdered material in the lower layer is sintered and molded into a silver-graphite contact face, and the alloy-forming materials in the upper layer are formed into a silver-copper alloy backing. The heat and pressure also bond the alloy backing and the silver-graphite face integrally together, the bond being strengthened by the combination of the backing material with the face material in the plane in which they meet.

After the contacts are made in this manner they are finished to size and the alloy back is identified for spot welding or brazing to the arm or other support that is to carry the contact element. If the alloying of the backing material of the element is not carried through to completion by the hot molding, it will be carried further by the welding or brazing heat when the contact is welded or brazed to its support. This latter operation thus benefits, rather than injures, the contact.

The two per cent of deoxidizing agent that is originally mixed with the silver and copper of the backing is sufficient to assure enough of it remaining in the hot pressed contact element to serve as a flux when the contact is welded or brazed to its metal support. This remaining deoxidizing agent deoxidizes the support without any necessity for additional flux and thereby simplifies the welding or brazing operation.

According to the provisions of the patent statutes, we have explained the principle and method of practicing our invention and have described what we now consider to represent its best embodiments. However, we desire to have it understood that, within the scope of the appended claims, the invention may be practiced otherwise than as specifically described.

We claim:

1. The method of making an electrical contact element, comprising cold molding a mixture of alloy-forming metal powders and a deoxidizing agent to the back of a layer of powdered electric contact face material to form a powdered composite body, and then hot molding said body to provide an alloy integrally united to the back of a metallic contact face, said alloy containing sufficient deoxidizing agent to serve as a flux when the contact element is welded or brazed to a metal support.

2. The method of making an electrical contact element, comprising cold molding a mixture of alloy-forming metal powders and a deoxidizing agent to the back of a layer of powdered electric contact face material to form a powdered composite body, heating said body to a temperature between 1200° and 1600° F. for a few seconds, and then immediately pressing the heated body under a pressure of from five to twenty tons per square inch to provide an alloy integrally united to the back of a metallic contact face, said alloy containing sufficient deoxidizing agent to serve as a flux when the contact element is welded or brazed to a metal support.

3. A molded electrical contact element having a metallic contact face of molded powdered material united to a backing in the form of a partially alloyed mixture of powdered silver, copper and a small amount of phosphorus.

4. A molded electrical contact element having a metallic contact face of molded powdered material united to a backing in the form of a partially alloyed mixture of alloy-forming metal powders and a small amount of a deoxidizing agent.

VERNON H. SANDERS.
NORBERT J. SCHABERL.
ERLE I. SHOBERT, II.